United States Patent [19]

Balleys

[11] Patent Number: 4,691,089

[45] Date of Patent: Sep. 1, 1987

[54] TRAVELLING WIRE EDM APPARATUS WITH MONITORING OF THE NUMBER OF ELECTRICAL DISCHARGES OCCURRING IN A SECTOR OF THE ACTIVE PORTION OF THE ELECTRODE WIRE

[75] Inventor: Francois Balleys, Petit-Lancy, Switzerland

[73] Assignee: Charmilles Technologies S.A., Geneva, Switzerland

[21] Appl. No.: 787,985

[22] Filed: Oct. 16, 1985

[30] Foreign Application Priority Data

Oct. 16, 1984 [CH] Switzerland ................... 4952/84

[51] Int. Cl.⁴ .................... B23H 7/04; B23H 1/02
[52] U.S. Cl. ....................... 219/69 W; 219/69 C
[58] Field of Search ............. 219/69 C, 69 W, 69 M, 219/69 R

[56] References Cited

U.S. PATENT DOCUMENTS

| | | | |
|---|---|---|---|
| 3,816,692 | 6/1974 | Ratmansky | 219/69 C |
| 3,997,753 | 12/1976 | Inoue | 219/69 M |
| 4,321,451 | 3/1982 | Inoue | 219/69 G |
| 4,329,558 | 5/1982 | Martin | 219/69 W |
| 4,559,432 | 12/1985 | Itoh | 219/69 S |
| 4,575,605 | 3/1986 | Martin | 219/69 C |

FOREIGN PATENT DOCUMENTS 147594 11/1979 Japan ........................ 219/69 W
57-46974 10/1982 Japan.

OTHER PUBLICATIONS

English translation of Japan Patent Document 53-64,899, published—11/1976.

Primary Examiner—A. D. Pellinen
Assistant Examiner—Geoffrey S. Evans
Attorney, Agent, or Firm—Gifford, Groh, VanOphem, Sheridan, Sprinkle and Dolgorukov

[57] ABSTRACT

In a travelling wire EDM apparatus, the electrode wire is divided into a plurality of sectors disposed along the active length of the electrode wire, and the numbers of electrical discharges occurring in each of the sectors from a predetermined starting time is detected. Those numbers are compared to reference values to determine the difference between the numbers of detected electrical discharges and corresponding reference values. In its simplest form, all the reference values are equal to the average value of the number of electrical discharges per sector. If one or more of the differences is higher than a predetermined threshold, an adequate modification of the machining parameters is effected as a function of the difference.

5 Claims, 8 Drawing Figures

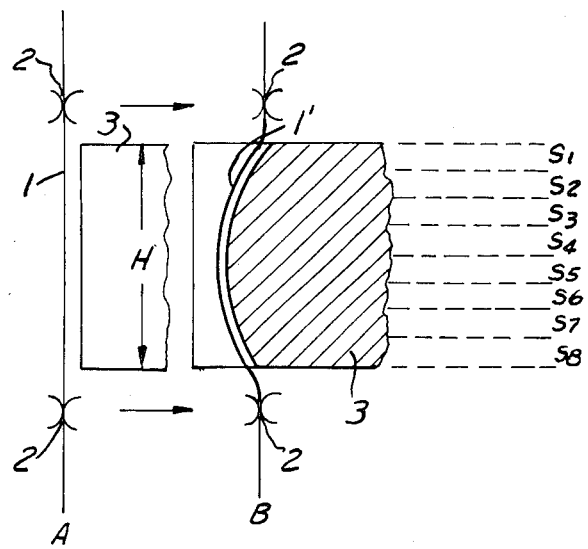
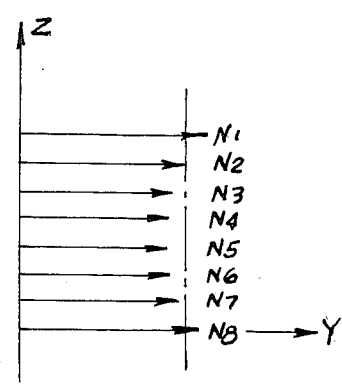
FIG. 1a  FIG. 1b  FIG. 1c
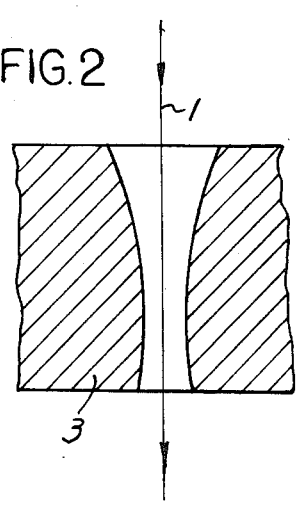
FIG. 2
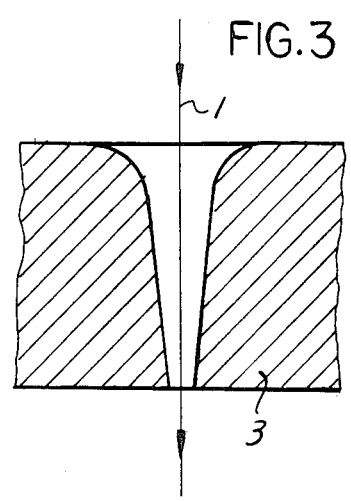
FIG. 3
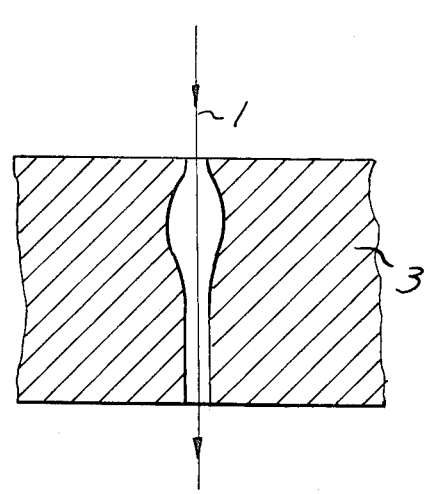
FIG. 4

TRAVELLING WIRE EDM APPARATUS WITH MONITORING OF THE NUMBER OF ELECTRICAL DISCHARGES OCCURRING IN A SECTOR OF THE ACTIVE PORTION OF THE ELECTRODE WIRE

BACKGROUND OF THE INVENTION

The present invention relates to a process for controlling the shape of a workpiece surface machined by a travelling electrode wire and to an EDM apparatus for practicing the method.

Known methods for detecting machining errors in the course of cutting a workpiece in a travelling wire EDM apparatus, by means of an electrode wire, such known methods consisting in measuring the deviation of the electrode wire relative to a straight line drawn between the electrode wire guide members, either by a direct measurement of the deviation between the workpiece and one of the electrode wire guides, or with respect to the motion of the electrode wire guides relative to the workpiece. The deviation of the wire causes an error in the cutting path or causes a convex or concave surface to be machined on the workpiece when a finish machining operation is effected.

In addition, other machining surface defects can appear on the machined surface even though the electrode wire may be drawn rectilinear between its guides. One of the causes for such surface defects is due to variations in the pollution rate of the dielectric fluid along the machining zone, whose effect it is to vary in turn the machining gap between the electrode wire and the workpiece surface as a direct function of the pollution rate. Another cause for such surface defects is due to dirt or other debris adhering to the workpiece at some portions of the machining zone. The known methods for detecting machining errors are not capable of detecting surface defects and are therefore not capable of avoiding such defects by way of an adequate modification of the machining conditions.

SUMMARY OF THE INVENTION

The present invention has for principal object the detection of the machining surface defects in a travelling wire EDM apparatus. As a result of detecting such defects, appropriate measures can be taken for modifying the machining conditions, for example by varying the injection of dielectric fluid into the machining zone, when a substantial difference is detected between a concentration of the number of electrical discharges at different portions or sectors of the machining zone and a predetermined concentration of electrical discharge as programmed. For the purpose of further increasing the accuracy, each electrical discharge which is counted may be "weighted" as a function of the machining current of that particular electrical discharge.

Other objects and advantages of the present invention will be immediately apparent to those skilled in the art when the following description of the best mode contemplated, at the present, for practicing the invention is read in conjunction with the accompanying drawing illustrating examples of apparatus for practicing the invention.

BRIEF DESCRIPTION OF THE DRAWING

FIGS. 1a–1c are schematic diagrams illustrating the deviation of an electrode wire while effecting a cut in a workpiece together with a corresponding schematic diagram illustrating the principle of counting the electrical discharges;

FIG. 2 is a schematic illustration of the deformation of the cut in a workpiece due to irregularities in the dielectric fluid flow;

FIGS. 3 and 4 are schematic illustrations similar to FIG. 2 but showing modifications of the cut due to variation of the concentration of the machining debris in the machining zone;

DETAILED DESCRIPTION OF THE PREFERRED EMBODIMENT

Figure 5:
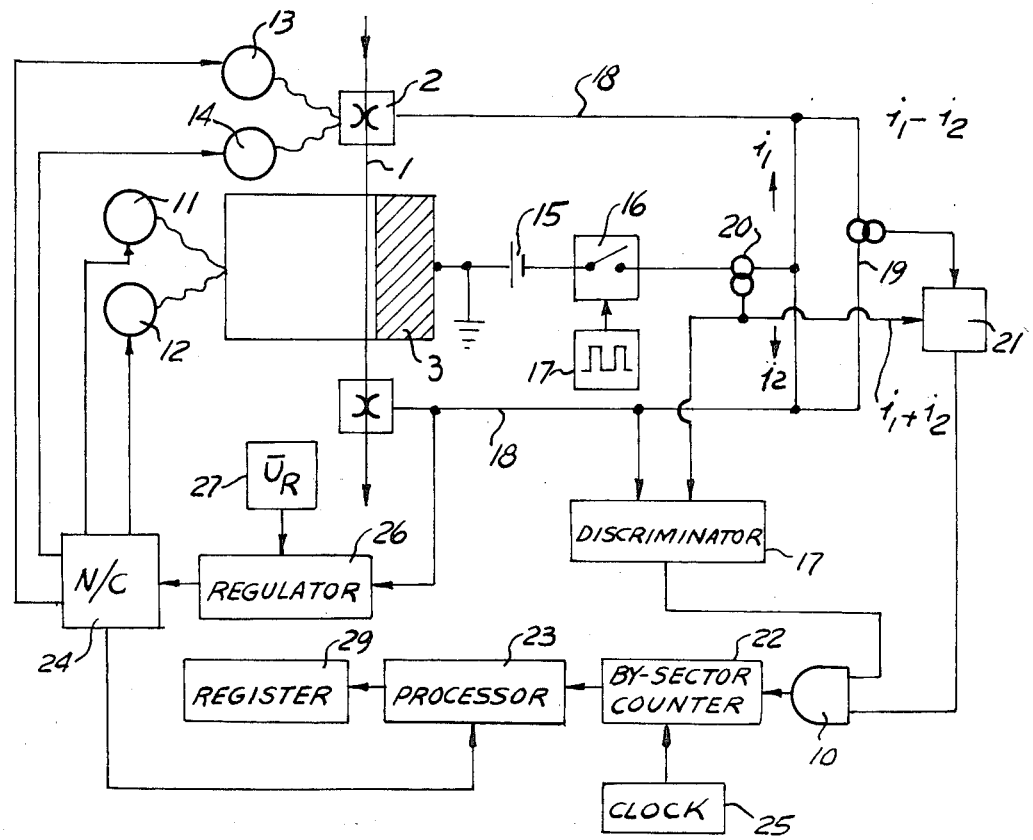
FIG. 5 is a block diagram schematic of a travelling wire EDM apparatus provided with the machining defects detecting system of the invention.

Referring to FIGS. 1a–1b of the drawing, there is schematically illustrated a simple machining condition wherein an electrode wire 1 stretched between a pair of electrode wire guides 2 has been displaced from the position A, FIG. 1a, to the position B, FIG. 1b, while effecting a cut in a workpiece 3 having a thickness H. The feed of the electrode wire 1 relative to the workpiece 3 and the different forces of attraction and repulsion acting upon the electrode wire while effecting a cut in the workpiece result in the active portion of the electrode wire in the machining zone adopting a curved shape as shown at 1' at FIG. 1b, when reaching the position B. Instead of being rectilinear between its guides 2, the wire electrode has now taken a curved shape with the top of the curve trailing behind the imaginary straight line between the guides 2. There results a machining error in the event that the cutting path in a plane octagonal to the imaginary straight line effects a small radius turn at the position B.

It is assumed that the height H of the workpiece 3 is divided into eight sectors, or slices, S1 through S8, as schematically represented at FIGS. 1b and 1c, such that the active portion of the electrode wire 1 in the machining zone is also divided in eight imaginary sectors. At FIG. 1c, the axis Z represents a coordinate parallel to the straight line between the electrode wire guides, and thee axis Y represents a coordinate parallel to which are drawn vectors N1 through N8 representing the number of Ni electrical discharges detected in each of the eight sectors since the beginning of the cutting operation. It is is further assumed, for the sake of simplification, that the value of the machining current, and consequently the quantity of material removed from the workpiece, is constant for each electrical discharge, the quantity of material removed in each sector S1 through S8 is proportional to the number Ni, or number N1 through N8, of discharges which have occurred in a corresponding sector. The differences between each of the numbers N1 through N8 and a reference value which, in its simplest form, can be the average Nor all the values N1 through N8, permits a determination of the shape taken by the electrode wire at the position B, FIG. 1b, if counting is started from a moment at which the electrode wire is rectilinear, for example, when in the position A, FIG. 1a. If it is known that the slot or kerf cut by the electrode wire 2 in the workpiece is generally widened at its top, as shown at FIG. 2, the numbers Ni corresponding to the upper portion of the slot can be multiplied. for example, by an appropriate correcting factor, smaller than 1, in order to obtain corrected numbers Ni' essentially proportional to the distance traveled by the electrode wire through the corresponding sectors since the beginning of the counting. Alternatively, it is of course possible to adjust not only the numbers Ni but also the reference numbers Ri to which they are compared in order to detect a machining defect.

In a similar fashion, it is desired to take into consideration the fact that different electrical discharges carry different current values which vary according to the machining condition and remove from the workpiece a quantity of material which varies, each electrical discharge can be weighted as a function of the quantity of removed material as determined by measuring the machining current, and replace the counting of the electrical discharges in each sector by the adding of values proportional to the weight given to each electrical discharge.

When a comparison between the numbers obtained by counting the electrical discharges, or by adding electrical discharge weighing value in each sector, and a corresponding series of reference values reveals a difference between at least some of the detected values and the corresponding reference values which is too large, an alarm is triggered, or some automatic procedure for correction is started, which can consist of an adjustment of the flow rate of the dielectric fluid injected into the machining zone, a slowing of the cut feed, or any other appropriate correcting measure.

The method heretofore described for detecting the curvature of the electrode wire is applicable in a similar manner to the detection of geometric machining defects illustrated at FIGS. 2–4 wherein the plane of the drawing is perpendicular to the plane of the cut. For the sake of comparison with what has been heretofore described, an estimate of the amplitude of the errors illustrated at FIGS. 2–4 can be made particularly accurate if the detection of the error caused by the curvature of the electrode wire, FIGS. 1b–1c, is first effected by a method known in the art and the estimate is used to weight the number of electrical discharges in the various sectors. However, this is not absolutely necessary because, under stable machining conditions, the various sectors of the electrode wire are advancing at the same speed, and variations from one sector to the other in the number of electrical discharges by unit of time thus corresponds to differences in the lateral machining rate, i.e. to variations in the width of the slot or kerf cut in the workpiece, as illustrated at FIGS. 2–4.

The schematic diagram of FIG. 5, which illustrates a travelling wire EDM apparatus which comprises a circuit for detecting geometric machining errors, will now be described briefly. The workpiece 3 is cut by the longitudinally travelling electrode wire 1 stretched between the two guides 2. Two servo motors 11 and 12 control the displacement of the workpiece 3 in directions parallel to the plane of cut, and two additional servo motors 13 and 14 control the displacement of one of the wire guides 2 relative to the other, and consequently the orientation of the electrode wire 1 relative to the workpiece 3. The arrangement illustrated further comprises a pulse generator comprising a DC power supply 15 placed in series with a switch 16 which is controlled by an oscillator 17.

The position of each electrical discharge along the electrode wire is measured by a detection circuit, known in the prior art, and identified by elements 20 and 21. The circuit element 21 calculates the ratio, or quotient, of the difference $L1-L2$ to the sum $L1+L2$ of the two currents $i_1$ and $i_2$ circulating in the lines 18, one line being connected to one of the wire guides 2 and the other of the lines 18 being connected to the other wire guide 2. The difference, $i_1-i_2$, is measured in a line 19 shunting the two lines 18. The resulting quotient is compared with representative values for each sector of the wire, and the circuit 21 provides a logic signal at its output as soon as the value of the quotient corresponds to one of the representative values, as disclosed in application Ser. No. 647,415, filed Sept. 5, 1984, and assigned to the same assignee as the present application.

The signal is applied to one of the inputs of an AND gate 10. A discriminator circuit 17, well known to those skilled in the art, provides a logic signal at its output as soon as a machining electrical discharge appears, thus eliminating the effect of faulty non-machining electrical discharges which often take place under certain conditions of machining, such as having short circuits. It is well known that short circuits produce high current and a considerable drop of voltage as compared to normal electrical discharges. Short circuits result in some localized heating without removing material from the workpiece. The discriminator circuit 17 must thus be capable of recognizing a short circuit and not provide at its output a logic signal in the event of a short circuit. If the machining electrical discharges are classified as a function of their intensity, in order to weigh each electrical discharge when it is counted, the discriminator circuit 17 can be arranged to effectuate the weighing of each electrical discharge. The output signal from the discriminator circuit 17 enables the AND gate 10 to pass, for each machining electrical discharge, a signal in a counter corresponding to the portion of the wire where the discharge occurred. The counters required for storage are included in a by-sector counting unit 22 which, in addition, receives signals produced by a clock 25. The value of the number of electrical discharges per unit of time in the different portions, or sectors, of the electrode wire are supplied from the counting unit 22 to a processor 23 in which are stored, for example, predetermined reference values for each number of electrical discharges per unit of time, or, in the alternative, which is capable of providing reference values derived from the information data received from the counting unit 22. The processor 23 effectuates, in addition, the necessary comparisons for determining whether the difference between the numbers of machining electrical discharges and the reference values exceed a predetermined level or threshold. The comparisons can taken into consideration signals representing the relative displacements of the electrode wire and the workpiece, those signals being supplied to the processor 23 by a numerical control unit 24 that controls the servo motors 11–14. According to common practice, the numerical control unit 24 receives signals provided by a speed regulator 26 adjusting the gap through modifications of the electrode wire advance speed as a function of the difference between the effective voltage of machining and a reference voltage $\overline{U}_R$ provided by a voltage source 27. A memory or register 29 receives and stores the information data developed by the processor 23.

A particular application of the circuit of FIG. 5 consists in monitoring the instantaneous concentration of machining electrical discharges in any one of the electrode wire sectors, rather than evaluating geometric errors. Accidental concentration of electrical discharges causes local heating which could weaken the electrode wire and cause its rupture. The advantage presented by comparing the count of machining electrical discharges in each sector with a corresponding series of limit reference values is the possibility of adopting relatively high values for the sectors proximate to the top surface and for the sectors proximate to the lower surface of the workpiece, sectors where the electrode wire is best cooled as a result of being in the immediate vicinity of the dielectric fluid injection nozzles. The dielectric fluid nozzles are not illustrated at FIG. 5, but they are located between the workpiece 3 and each of the electrode wire guides 2. By contrast, in the vicinity of the workpiece median plane, where there is some difficulty for the dielectric fluid jet to reach because of the narrowness of the cut kerf, it is convenient to adopt reference values which are relatively low. It will be appreciated that if the comparison between the count of electrical discharges and the limit reference values discloses a dangerous situation, either an alarm signal is triggered, or some automatic procedure is triggered for correcting the problem as, for example, an increase of the flow of dielectric fluid, a slowing down of the cutting speed, or any other appropriate measure. It is even possible to provide a monitoring of the geometric errors co-operating with a monitoring of local heating of the electrode wire.

Figure 6:
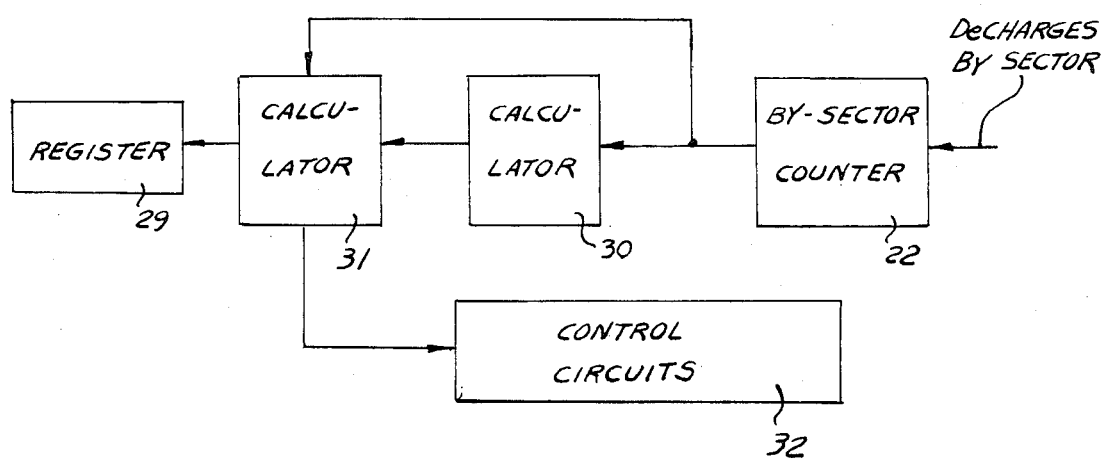
FIG. 6 is a functional schematic block diagram thereof.

FIG. 6 illustrates a functional schematic of an example of a circuit for processing the information data supplied by the counting unit 22. The circuit of FIG. 6 comprises a first calculator 30 providing an average value of the total of the electrical discharge having occurred in all the electrode wire sectors and a second calculator 31 for providing the difference between that average value and the value of the number of electrical discharges in each sector. The signals at the output of the second calculator 31 are applied to a register 29, which may eventually provide an alarm signal, and appropriate control circuits 32 varying the machining parameters and the dielectric fluid injection parameters to reduce or eliminate the detected defects.

Having thus disclosed the present invention by way of example of structural embodiments thereof, modifications whereof will be apparent to those skilled in the art, what is claimed as new is as follows:

1. A method for controlling the shape of a surface cut in an electrically conductive workpiece by machining electrical discharges by means of an electrode wire stretched and moving longitudinally between a pair of electrode wire guides, the electrode wire having an active portion disposed in a machining zone formed between the electrode wire and the surface cut in the workpiece, said method comprising arbitrarily dividing the active portion of the electrode wire into a plurality of sectors, detecting which one among the sectors along the active portion of the electrode wire provides a machining electrical discharge, counting the number of machining electrical discharges occuring in each one of the sectors of the active portion of the electrode wire during a predetermined time period, saving the count of said electrical discharges for each sector for each predetermined time period, and deriving a control signal as a function of the difference between each count in each sector and a corresponding reference value for controlling the electrical discharge machining process.

2. The method of claim 1 wherein the reference value is obtained by calculating the average value of the number of electrical discharges occurring in all the sectors of the active portion of the electrode wire.

3. The method of claim 1 wherein the count of the number of the machining electrical discharges is started at the moment when the electrode wire is positioned relative to the workpiece at a position preventing electrical discharges from occurring.

4. An apparatus for controlling the shape of a surface of an electrically conductive workpiece cut by machining electrical discharges by means of an electrode wire stretched and displaced longitudinally between a pair of electrode wire guides, the electrode wire having an active portion disposed in a machining zone formed between the electrode wire and the surface cut in the workpiece, said apparatus comprising means for arbitrarily devinding the active portion of the electrode wire into a plurality of sectors, means for detecting a sector among the plurality of sectors along the active portion of the electrode wire where an electrical discharge occurs, means for detecting machining electrical discharges, counting means associated with each of said sectors and with said machining electrical discharge detecting means for counting said machining electrical discharges in each of said sectors during a predetermined time period, means for saving the count of said electrical discharges for each sector for each predetermined time period, and processor means associated with said counting means for providing a signal representing the difference between the the count by said counting means and a corresponding reference value for controlling the electrical discharge machining process.

5. The apparatus of claim 4 wherein said processor means comprises a calculating unit determining the average value of the number of electrical discharges occurring in each of said sectors.

* * * * *